US010253798B2

(12) United States Patent
Roedder et al.

(10) Patent No.: US 10,253,798 B2
(45) Date of Patent: Apr. 9, 2019

(54) DEVICE FOR ATTACHING A GUIDE UNIT TO A FURNITURE PART

(71) Applicant: Grass GmbH, Hoechst (AT)

(72) Inventors: Bernd Roedder, Ruppichteroth (DE); Klaus-Dieter Schmidt, Nuembrecht (DE); Juergen Schnell, Lohmar (DE); Artur Hirtsiefer, Neunkirchen (DE); Heinz-Josef Henscheid, Ruppichteroth (DE)

(73) Assignee: Grass GmbH, Hoechst (AT)

( * ) Notice: Subject to any disclaimer, the term of this patent is extended or adjusted under 35 U.S.C. 154(b) by 592 days.

(21) Appl. No.: 14/748,437

(22) Filed: Jun. 24, 2015

(65) Prior Publication Data
US 2016/0025124 A1    Jan. 28, 2016

(30) Foreign Application Priority Data

Jun. 25, 2014    (DE) .................... 20 2014 102 893 U

(51) Int. Cl.
| | | |
|---|---|---|
| *A47B 88/423* | (2017.01) | |
| *F16B 12/04* | (2006.01) | |
| *A47B 88/427* | (2017.01) | |

(52) U.S. Cl.
CPC ............ *F16B 12/04* (2013.01); *A47B 88/427* (2017.01)

(58) Field of Classification Search
CPC ................. A47B 88/407; A47B 88/423; A47B 2210/0054; A47B 2210/0056
See application file for complete search history.

(56) References Cited

U.S. PATENT DOCUMENTS

| | | |
|---|---|---|
| 4,810,045 A | 3/1989 | Lautenschläger |
| 5,439,283 A | 8/1995 | Schröder et al. |
| 7,055,919 B2 * | 6/2006 | Lam Harn ............. A47B 88/95 312/265.5 |

(Continued)

FOREIGN PATENT DOCUMENTS

| | | |
|---|---|---|
| AT | 509 416 A1 | 8/2011 |
| AT | 511 418 A1 | 11/2012 |

(Continued)

OTHER PUBLICATIONS

European Search Report (Application No. 15172728.6) dated Nov. 24, 2015.

(Continued)

*Primary Examiner* — Michael P Ferguson
(74) *Attorney, Agent, or Firm* — Burr & Brown, PLLC

(57) ABSTRACT

A device for attaching a guide unit to a first furniture part which is movably guided relative to a second furniture part, wherein the guide unit includes a basic unit rail disposed on the second furniture part and a motion rail disposed on the first furniture part. Two bearing portions are disposed spaced apart on a lower edge of the device, which is provided for disposal on the motion rail. Each of the bearing portions is configured on a side which faces the respective other bearing portion, such that the motion rail can be disposed between the bearing portions. At least one of the bearing portions is mounted on the device so as to be readjustable so that a position of the bearing portion is modifiable to align the first furniture part in the assembled state in a horizontal direction in relation to the motion rail.

7 Claims, 3 Drawing Sheets

(56) References Cited

U.S. PATENT DOCUMENTS

| | | |
|---|---|---|
| 9,179,771 B2 | 11/2015 | Haemmerle et al. |
| 2009/0167128 A1 | 7/2009 | Berger |
| 2009/0251037 A1 | 10/2009 | Berger |
| 2012/0319548 A1 | 12/2012 | Netzer |
| 2013/0293077 A1 | 11/2013 | Haemmerle et al. |
| 2014/0015391 A1* | 1/2014 | Feuerstein ............. A47B 88/18 |
| | | 312/334.4 |
| 2014/0055021 A1 | 2/2014 | Grabherr et al. |

FOREIGN PATENT DOCUMENTS

| | | |
|---|---|---|
| AT | 013 205 U1 | 8/2013 |
| DE | 36 32 442 A1 | 3/1988 |
| DE | 93 00 260 U1 | 3/1993 |
| DE | 296 00 180 UI | 2/1996 |
| DE | 20 2006 003 035 U1 | 8/2007 |
| DE | 20 2006 006 065 U1 | 9/2007 |
| EP | 2 636 339 A1 | 9/2013 |
| WO | WO 2009/056326 * | 5/2009 ............. A47B 88/04 |
| WO | 2012/092634 A1 | 7/2012 |

OTHER PUBLICATIONS

German Search Report (Application No. 20 2014 102 893.5) dated May 11, 2015.

* cited by examiner

DEVICE FOR ATTACHING A GUIDE UNIT TO A FURNITURE PART

This application claims the benefit under 35 USC § 119(a)-(d) of German Application No. 20 2014 102 893.5 filed Jun. 25, 2014, the entirety of which is incorporated herein by reference.

FIELD OF THE INVENTION

The present invention relates to a device for attaching a guide unit to a furniture part, and to an item of furniture.

BACKGROUND OF THE INVENTION

Devices by way of which a guide unit can be attached to a furniture part are known in the most varied embodiments in the field of furniture construction. In particular for a furniture part which is guided so as to be movable in relation to a second furniture part, an attachment device is often configured for positioning the furniture parts in relation to one another, preferably in a closed position of the furniture part on the second furniture part, for example, or in relation to the guide device.

SUMMARY OF THE INVENTION

The present invention is based on the object of providing a device for attaching a guide unit, which offers improved positioning capability while being comparatively easy to attach.

The present invention proceeds from a device for attaching a guide unit to a first furniture part which is guided so as to be movable in relation to a second furniture part, wherein the guide unit comprises a basic unit rail which is disposed on the second furniture part and a motion rail which is disposed on the first furniture part.

The core of the present invention lies in that two bearing portions are disposed so as to be spaced apart from one another on a lower edge of the device, which is provided for disposal on the motion rail, wherein each of the bearing portions is configured on a side which faces the respective other bearing portion, such that the motion rail can be disposed between the bearing portions, wherein at least one of the bearing portions is mounted on the device so as to be readjustable in such a manner that a position of the corresponding bearing portion is modifiable so as to be able to align the first furniture part in the assembled state in a horizontal direction in relation to the motion rail. This offers the advantage that a lateral clearance of the first furniture part on the motion rail may be limited or completely avoided.

The first furniture part may be a furniture pullout, for example a drawer, which by way of a guide unit is guided so as to be movable on and in particular attached to a furniture basic unit, for example, as a second furniture part. The furniture basic unit may be a basic unit of a wardrobe, for example, of a chest of drawers, for example, of a table, for example, or of any item of furniture which is configured in a similar manner for movably mounting and receiving a furniture pullout. For guiding a motion in a stable manner, the first furniture part may be movably guided on the second furniture part by way of two guide units which preferably are attached to opposite sides of the first furniture part, having in particular parallel guide paths.

The lower edge is an external edge of the device, by way of which preferably an outermost extent of the device is delimited on one side, that is to say an external side, and which in an assembled state is provided for a downwardly directed disposal. Preferably the device is provided for assembly on the first furniture part in which the lower edge is disposed so as to face the motion rail and in particular an upper side of the motion rail. Preferably at least one portion of the lower edge here is provided for bearing and in particular for bearing in a planar manner on a surface of the motion rail.

The device preferably is provided for assembly on a rear side of the first furniture part, for example a rear wall of a drawer. In the assembled state, the lower edge of the device preferably is disposed in the region of a lower edge of a rear wall of the first furniture part and may in particular project downward beyond the lower edge of the rear wall of the first furniture part, when in particular the stability or strength, respectively, of the device is conceived for supporting the first furniture part in the region of the rear wall, for example, on the motion rail.

In the assembled state of the device, a plurality of lower edges instead of the one lower edge may be provided for the device to bear on. A plurality of the lower edges and in particular all lower edges may lie in a common plane, for example, so as to distribute forces in a comparatively uniform manner across the plurality of lower edges while bearing thereon. Furthermore, a plurality of lower edges which are separately configured may be disposed in different positions, for example positions which are parallel with one another, such that only one lower edge in each case is selectable for bearing thereon, for example in the event of the device being attached at various inclinations.

Preferably, the lower edge delimits a surface area which is provided for bearing on the motion rail. Optionally, this applies to a plurality of lower edges which in each case delimit one of a plurality of separate surface areas. The surface area may delimit for example a portion of an end side on the respective outer side of the device. The lower edge here may form a lower side of the device.

The lower edge and optionally a surface area which is delimited by the lower edge may at least partially and in particular largely, that is to say to more than half of an in particular continuous longitudinal extent of the lower edge, be disposed below a center of gravity or for example a geometrical center, respectively, of the device. On account thereof, a concentrated, for example unilateral, transmission of force is avoidable, on account of which the device advantageously is durable and employable over a long period.

Preferably, the lower edge is adapted to a shape of an upper side of the motion rail. To this end, the lower edge optionally may be linear and a surface area which is delimited by the former may be configured so as to be planar on the lower side. Moreover, the lower edge may be provided with, for example, a plurality of pimples, treads, or similar protruding structures which are employable for bearing on the motion rail. The lower edge thus advantageously may, for example, be adapted to a roughened, in particular structured, surface of the motion rail.

The stop portions may be configured as linear planar faces, for example, which are configured so as to be perpendicular, for example, to the in particular linear lower edge of the device. On account thereof, assembly can be facilitated since the drawer is guided by way of both stops when being attached to the motion rail. In this way, a clearance for motion of the drawer during assembly may be limited or entirely avoided. Optionally, the device needs to be provided only on one side of, for example, a rear wall of the first furniture part, in order to be attached to a motion rail. Here, a rail attachment part which, for example, is comparatively simple in terms of construction and correspondingly cost effective, for the first furniture part may be provided here on an opposite side, for example on a left side of the rear wall, when the device according to the invention is attached on the right. Furthermore, a component for attaching to the opposite side may be entirely dispensable here when one or two motion rails come to lie for example closer to a central axis of a lower side which is parallel with the direction of movement than to outer sides of lateral frames of the first furniture part.

One preferred embodiment of the invention lies in that the positions of the bearing portions on the device are adjustable independently of one another. This offers the advantage that the device may be advantageously employed for various attachment positions of the motion rail on the first furniture part, as well as for various motion rails having various widths, for example. The two positionable bearing portions may be adjustable by way of two identical or by way of two different readjustment installations.

Preferably, at least one of the bearing portions is attached to a support element which is configured for supporting the device on the motion rail. The lower edge here may be provided by the support element and optionally, together with the protrusion, form a stop angle. The device can be simplified if the support element is connected to the device in particular so as to be laterally displaceable, such that a position of the bearing portion on a lower side of the device is adjustable, for example.

Furthermore, it is preferable that the positions of the two bearing portions on the device are adjustable in an interlinked manner. On account thereof, it may be ensured, for example, that by way of a lateral adjustment of one of the first bearing portions the second bearing portion in principle is conjointly guided.

A further preferred embodiment of the invention provides that the spacing between the two bearing portions, in particular between stop portions, is fixedly predefined. On account thereof, the device advantageously may be embodied so as to be stable. In particular if a spacing between the stop portions is adapted to a width of a motion rail, reliable positioning can be ensured in a comparatively simple manner on account thereof. For example the two stop portions may be interconnected by way of a displaceable connection yoke. The support element and the connection yoke may be interconnected in an integral manner, in particularly a materially integral manner.

Preferably, the position of at least one of the bearing portions is readjustable by way of a set screw. On account thereof, positioning may be combined with fixing or attaching, respectively, and fastening.

Furthermore, the position of at least one of the bearing portions may be readjustable by means of a rotary element having a helical driving contour. The rotary element may be rotatably attached to the device at a predefined position, for example, wherein for positioning an engagement portion of, for example, one of the bearing portions engages on the helical driving contour. Moreover, a rotary element having, for example, a circular driving contour which is eccentrically disposed to the rotation center is employable for positioning for example one of the bearing portions or both bearing portions. Furthermore, the driving contour may be elliptical. The driving contour may be molded as a groove on an engagement side of the rotary element. On account thereof, a comparatively precise adjustment capability is advantageously achievable with a comparatively flat constructive design.

Preferably, an arrester receptacle for an arrester installation of the motion rail is configured on the support element. In this way, the degree of freedom of movement in particular laterally to the pullout direction of the furniture part can be limited.

The arrester receptacle may be configured for receiving a portion of the arrester installation in a clearance-free manner, on account of which positioning of the motion rail on the furniture element may be ensured for a comparatively long service life.

Preferably, the device comprises an assembly element which is provided for attaching the device to the first furniture part. The assembly element may have a dowel, for example, or a bore, for example, for screwing the device to the first furniture part.

Preferably, at least the one readjustable bearing portion is displaceably mounted on the assembly element. Furthermore, one of the bearing portions may be mounted so as to be displaceable in relation to the assembly element by way of an intermediate element, in particular on the intermediate element, on account of which the bearing portion is positionable in various directions in relation to the assembly element, for example.

The basic concept of the invention may be refined in the direction of an attachment device which is equipped with two attachment units for attaching a guide device to a first furniture part. The furniture part is guided by way of two guide units of the guide device so as to be movable in relation to a second furniture part, wherein each guide unit comprises a motion rail which is disposed on the first furniture part, and wherein for each motion rail in each case one of the attachment units is provided for attaching the first furniture part to the corresponding guide unit. According to the invention, here at least one of the two attachment units is a device according to the invention of the type described above. Here, a first attachment unit which is configured according to the invention may be provided for precise positioning, so as to form a fixed bearing of the attachment device. On account thereof, the second attachment unit for a second motion rail can be comparatively more easily configured, in particular without positionable bearing portions. The bearing portions of the second attachment unit may be disposed so as to be spaced apart, for example, which spacing provides a clearance for motion of the furniture part on the second motion rail when the first attachment unit is adjusted, for example, and during assembly of the furniture part on, for example, two guide units delimits assembly movements in such a manner that the furniture part is attachable in a comparatively rapid and comfortable manner.

In particular, both attachment units may be configured in the form of devices according to the invention, wherein the two attachment units preferably are configured so as to be mirror-symmetrical in relation to one another. On account thereof, an attachment device according to the invention advantageously may be configured in a space-saving manner, in particular in a flat construction. Here, for example, set screws or rotary elements having driving contours advantageously can be disposed such that they do not laterally protrude beyond a cross-sectional profile of the furniture part and if applicable, on account thereof, do not enable disruptions, for example in the movements of the furniture part when being extended or retracted.

BRIEF DESCRIPTION OF THE DRAWINGS

In the following, the invention will be described by means of exemplary embodiments and with the aid of drawings, in which.

DETAILED DESCRIPTION OF THE INVENTION

Figure 1:
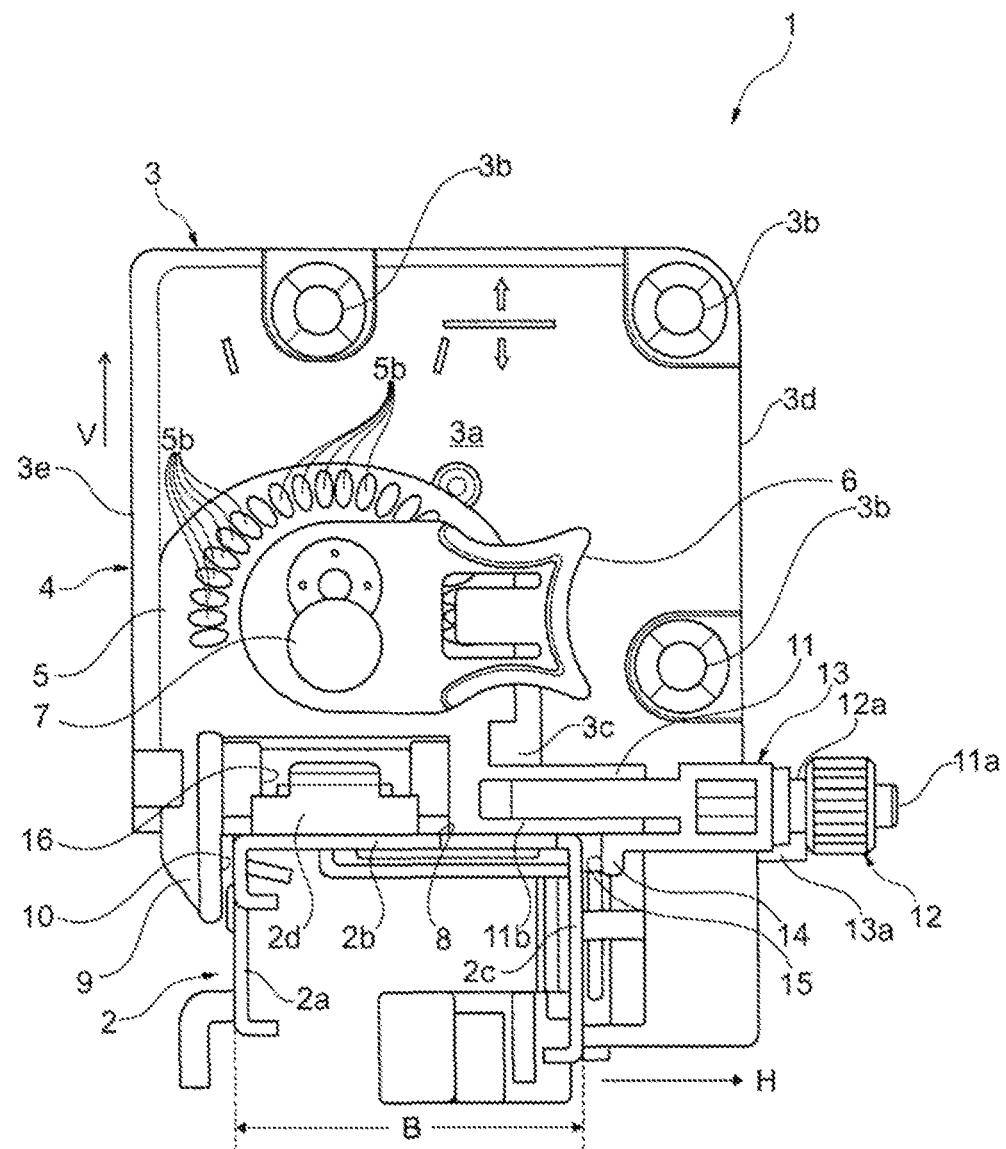
FIG. 1 schematically shows a perspective view of a rear side of a device according to the invention.

A first exemplary embodiment of a device 1 according to the invention, which in the following is referred to as the assembly device 1, is shown in FIG. 1. The assembly device 1 is located on an attachment installation 2d of a motion rail 2 at the rear end portion thereof. The motion rail 2 is the only component of a guide unit which is illustrated here.

The motion rail 2 has a rectangular and channel-shaped cross-sectional profile which is laterally delimited by linear, vertical profile portions 2a and 2c. The vertical profile portions 2a and 2c are connected by way of a linear, horizontal profile portion 2b which upwardly delimits the cross-sectional profile of the motion rail 2. The attachment installation 2d forms a stop for attaching a movable furniture part (not shown), on account of which stop displacement of the furniture part beyond an end of the motion rail 2 is precluded during assembly.

The assembly device 1 has an assembly plate 3 which at a plurality of points is provided with bores 3b, in order for the assembly device to be screwed to a rear wall (not shown) of a movable furniture part, for example a drawer. FIG. 1 shows a view of a rear side of the assembly device 1, on account of which a rear side 3a of the assembly plate 3 is visible.

An attachment side (not shown) which may be configured, for example, as a closed, planar face for bearing on a rear wall (not shown) of a movable furniture part (not shown) lies on the assembly plate 3, so as to be opposite the rear side 3a. On account thereof, the assembly plate 3 by way of the attachment side may bear in a planar manner on the rear wall of the movable furniture part once the assembly plate 3 is screwed to the bores 3b on the rear wall, for example. The attachment side may predefine a plane for bearing on a furniture part, beyond which no portion of the assembly device 1 protrudes on the attachment side in a direction which is perpendicular to the plane, so as to avoid limitations connected therewith when the assembly device 1 is attached to the rear side of the furniture part.

The assembly device 1 has a height readjustment installation 4 which comprises a support plate 5 which is mounted on the assembly plate 3 so as to be vertically displaceable. Here, vertical displacement movements of the support plate 5 are guided on a guide protrusion 3c, for example, here in the form of a linear strip which extends vertically, for example.

An adjustment lever 6 is rotatably mounted in the support plate 5 in such a manner that supporting forces are transmissible from the adjustment lever 6 to the support plate 5. A slide pin 7 which penetrates through the support plate 5 and engages in the assembly plate 3 in such a manner that supporting forces are transmissible from the adjustment lever 6 via the slide pin 7 to the assembly plate is attached to the adjustment lever 6.

The slide pin 7 is disposed on the adjustment lever 6 so as to be eccentric in relation to a rotation center of the adjustment lever 6. On account of the eccentric disposal of the slide pin 7 on the adjustment lever 6, the support plate 5 and the assembly plate 3 are readjustable in relation to one another in the vertical direction V by pivoting the adjustment lever 6.

Above a central portion on a lower side of the support plate 5, a linear lower edge 8 which is configured for bearing on the motion rail 2 is configured. On the left side, the lower edge 8 is delimited by a protrusion 9 which protrudes downward from the support plate 5. A bearing face 10 of the protrusion 9, which faces the profile portion 2a of the motion rail 2, is disposed so as to be perpendicular to the lower edge 8. On account thereof, the bearing face 10 can be disposed so as to be coplanar with the profile portion 2a of the motion rail 2.

In a lower region along the lower edge 8, the support element 5 is extended toward the right by way of a beam portion 11. Here, a right-hand side part of the beam portion 11 is configured as a cylindrical threaded bolt 11a onto which a knurled nut 12 can be screwed. The lower edge 8 is extended on a substantially rectangular-shaped connection portion 11b of the beam portion 11. A slide element 13 which is guided on the beam portion 11, is plugged onto the beam portion 11, for example. A groove 12a which is provided for engaging an engagement portion 13a of the slide element 13 is configured on the knurled nut 12. The slide element 13 can be horizontally displaced and positioned in a plane of the support element 5 by rotating the knurled nut 12 on the threaded bolt 11a.

A protrusion 14 downwardly protrudes on a lower side of the slide element 13. A vertical planar bearing portion 15 is configured on a side of the protrusion 14 which faces the protrusion 9. Preferably, the bearing portions 10 and 15 are configured so as to be coplanar with one another, on account of which both bearing portions 10, 15 can simultaneously bear in a planar manner on the motion rail 2. Preferably, both bearing portions 10 and 15 are provided with planar faces for bearing on the motion rail 2. Optionally, at least one of the bearing portions 10, 15 may be configured as an edge. Preferably, the profile and the shape of the bearing portions 10 and 15 are adapted to the respective cross-sectional profile of the motion rail 2.

Prior to attaching a furniture part (not shown) to the motion rail 2, which may be attached together with a remaining guide unit (not shown) in a basic furniture unit (not shown), for example, the assembly device 1 is fastened to a rear wall (not shown) of the furniture part by screwing the assembly plate 3 thereto. On account of rotating the knurled nut 12, the right-hand bearing portion 15 is positionable so as to be spaced apart from the left-hand bearing portion 10, the spacing being greater than a width B of the motion rail 2. On account thereof, the furniture part with the assembly device 1 can be moved along on the motion rail 2 with comparative ease until the assembly device 1 stops on the attachment installation 2d.

Here, a spacing between the bearing portions 10 and 15 may be adjusted in such a manner that a lateral clearance for motion of the assembly device 1 on the motion rail 2 cannot prevent the hook-shaped attachment installation 2d being reliably introduced at a receptacle opening 16 on the support plate 5. Preferably, the assembly device 1 is part of an assembly system of which only the assembly device 1 is shown here. The assembly system may comprise a second assembly device (not shown) according to the invention, which is constructed so as to be mirror-imaged in relation to the assembly device 1. The second assembly device here is embodied so as to be mirror-imaged in such a manner that it is produced, for example, by being mirrored on a plane which is disposed so as to stand in a perpendicular manner in relation to the planar face on the attachment side of the assembly plate and so as to be parallel, for example, to the lateral edge 3*d* or 3*e*. On account thereof, the assembly system may be attached on a rear side of a movable furniture part, for example, of a drawer, so as to be, for example, symmetrical and in particular without laterally projecting parts.

Figure 2:
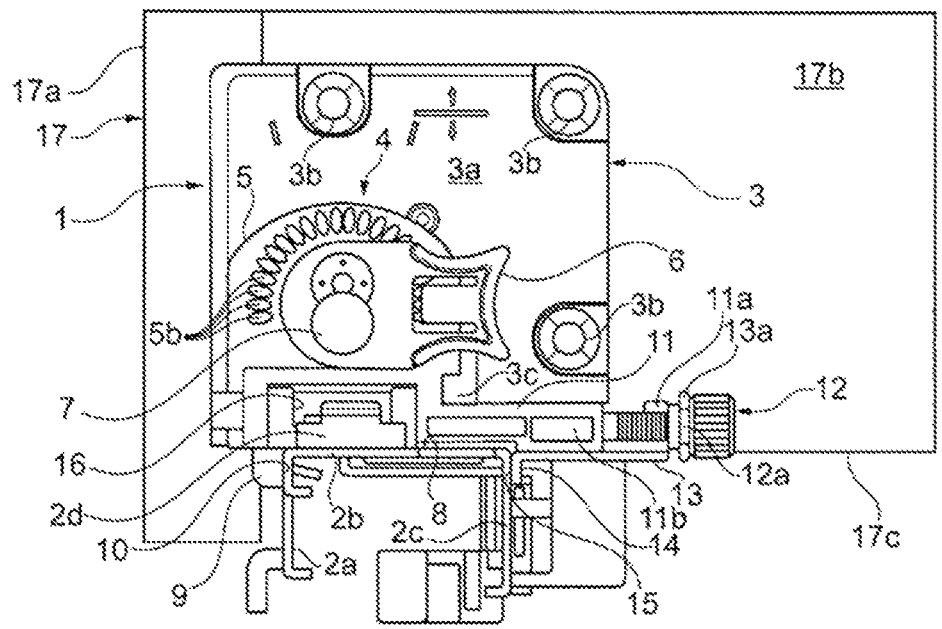
FIG. 2 schematically shows a front view of an attachment side of a second embodiment of the invention, in a partially transparent illustration.
Figure 3:
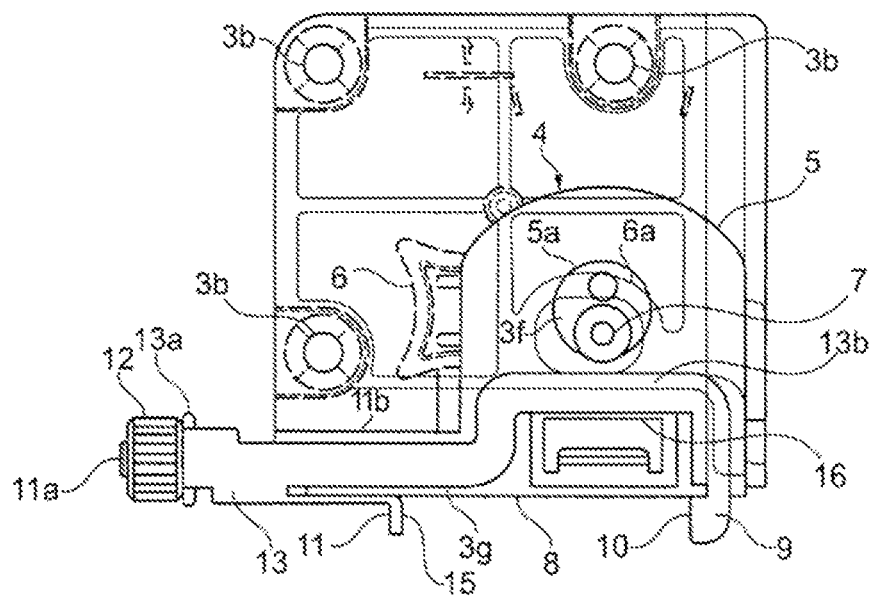
FIG. 3 schematically shows a rear view of the second embodiment.

In FIGS. 2 and 3 a second embodiment of an assembly device 1 according to the invention is shown, wherein in FIG. 2 a disposal of the assembly device 1 on a movable furniture part 17, in particular in the form of a drawer, is illustrated. The furniture part 17 has a side wall 17*a* and a rear wall 17*b*. An assembly plate 2 of the assembly device 1 may be fastened to the bores 3*b* on the rear wall 17*b* of the furniture part 17, for example using screws (not shown) or for example nails (not shown). The furniture part 17 is positioned and attached by way of the assembly device 1 to a motion rail 2, the motion rail 2 being the only element of a guide unit which is illustrated in FIGS. 2 and 3.

The assembly device 1 has a height readjustment installation 4 which substantially corresponds to that of the first exemplary embodiment. Further details of the height readjustment installation 4 here are identifiable in particular in FIG. 3. A protrusion 6*a* in the shape of a circular disk, by way of which the adjustment lever 6 is mounted in a circular opening 5*a* of a support plate 5, is configured on an adjustment lever 6.

A slide pin 7 protrudes so as to be eccentric in relation to the circular disk shape of the protrusion 6*a* of the adjustment lever 6 through the adjustment lever 6 and the support plate 5 and into a horizontally extended elongate hole 3*f* of the assembly plate 3. By rotating the adjustment lever 6, the slide pin 7 is movable about a common center of the circular-disk shaped protrusion 6*a* and of the opening 5*a* on a circular-arc shaped path, wherein a lateral clearance for motion is provided for the slide pin 7 by way of the elongate hole 3*f* on the assembly plate 3.

On account of the adjustment lever 6 being rotated, an exclusively vertical displacement of the assembly plate 3 in relation to the support plate 5 is achievable, wherein support forces are transmitted via the protrusion 6*a*, which is mounted in the opening 5*a*, and the slide pin 7. In this way, a lower edge 3*g* of the assembly plate and a lower edge 17*c* of the furniture part 17 which is connected to the assembly plate 3 is liftable over a lower edge 8 of the support plate 5 and vertically positionable by arresting the adjustment lever 6 in one of the latching depressions 5*b*, for example. Preferably, the lower edge 8 is supported on a horizontal linear profile portion 2*b* of the motion rail 2, on and against which the lower edge 8 preferably uniformly bears, respectively. Optionally, a location of the lower edge 8 of the support plate 5 above the lower edge 3*g* of the assembly plate 3 is adjustable by way of the height readjustment installation 4. On account thereof, the height readjustment installation 4 can be relieved once the assembly plate 3 has been attached, for example, in a suitable position to the rear wall 17*b*, which no longer requires additional readjustment.

In contrast to the first exemplary embodiment (FIG. 1), both a first protrusion 9 as well as a second protrusion 14 are interconnected in a substantially rigid manner by way of a connection yoke 13*b* of a slide element 13 on the assembly device 1 according to the invention which is shown in FIGS. 2 and 3. Here, a first bearing portion 10 and a second bearing portion 15 are disposed so as to be fixedly spaced apart from one another in such a manner that the motion rail 2 can be disposed between the bearing portions 10 and 15.

The slide element 13 is linked by way of an engagement portion 13*a* to a set nut 12, on which a groove 12*a* for a linking engagement of the engagement portion 13*a* is provided. The set nut 12 is screwed onto a threaded portion 11*a* of a beam portion 11 by way of which the lower edge 8 of the support plate 5 is extended across at least an entire width of the horizontal profile portion 2*b* of the motion rail 2.

By rotating the knurled nut 12, the slide element 13 can be displaced and positioned along the lower edge 8 in relation to the support plate 5, the positions of both bearing portions 10 and 15 being simultaneously modifiable. Since the bearing portions 10 and 15 may engage on the motion rail 2 from opposite sides, the assembly device 1 offers the possibility for a position of the furniture part 17 to be readjusted in opposite directions. Once a spacing of the bearing portions 10 and 15 has been adapted to a width of the motion rail 2, in particular for a comparatively small clearance for motion or none at all, the assembly device 1 can be employed as an adjustable fixed bearing for laterally positioning the furniture part 17, on account of which a second assembly device (not shown) which is provided for assembling the furniture part on a second motion rail (not shown) may be configured as a floating bearing having a lateral clearance for motion and optionally having at least one stationary bearing portion (not shown). An assembly system according to the invention, corresponding to an attachment device according to claim 14 or 15, having a first assembly device according to the invention and a second assembly device which is employable as a floating bearing is comparatively easy and quick to attach and to adjust.

Figure 4:
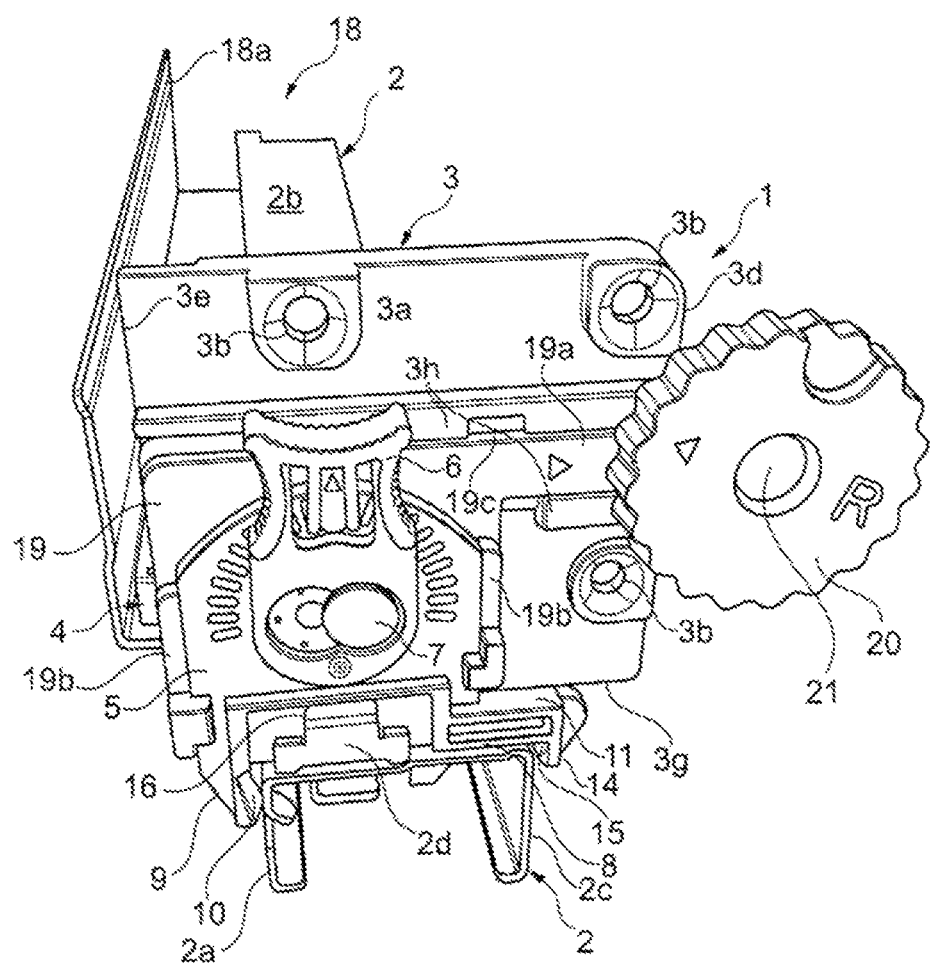
FIG. 4 schematically shows a perspective view of a third embodiment of the invention.

A third exemplary embodiment for an assembly device 1 according to the invention is shown in FIG. 4. Here, the assembly device 1 is assembled on a motion rail 2 of a guide unit 18. The motion rail 2 is displaceable along a longitudinal axis of the guide unit 1, wherein the motion rail 2 is directly or indirectly, for example by way of an intermediate rail (not shown), guided and mounted so as to be movable on a basic unit rail 18*a*. The motion rail 2 on one end portion has an attachment installation 2*d*, on account of which an assembly position for the assembly device 1 is predefined. A receptacle opening 16 which preferably is provided for a clearance-free engagement of the in particular hook-shaped attachment installation 2*d* is configured on the assembly device 1.

The assembly device 1 comprises a height readjustment installation 4 by way of which an assembly plate 3 is displaceable or readjustable, respectively in the vertical direction in relation to a support plate 5 by rotating an adjustment lever 6. However, a difference to the second exemplary embodiment lies in that a slide pin 7 does not directly engage into the assembly plate 3 but into an intermediate plate 19. Linear and strip-shaped guide protrusions 3*h* which run parallel with a linear horizontal lower edge 3*g* of the assembly plate 3 are configured in a stationary manner on a rear side 3*a* of the assembly plate 3. The intermediate plate 19 by way of the guide protrusions 3*h* is guided so as to be horizontally displaceable on the assembly plate 3, wherein an upper one of the guide protrusions 3*h* is provided and configured for transmitting supporting forces for vertical positioning of the assembly plate.

Stationary guide protrusions 19b which in an assembled state of the assembly device 1 run linearly in the vertical direction are configured on the intermediate plate 19. The guide protrusions 19b are disposed and configured on the intermediate plate 19 in such a manner that by way of the former the support plate 5 is adjustable in a movable manner in the vertical direction.

A further difference between the assembly device 1 shown in FIG. 4 and the second embodiment lies in that a first protrusion 9 and a second protrusion 14 are configured so as to be stationary on the support plate 5. On the lower edge 8, the support plate 5 is extended by a beam portion 11, so as to configure the lower edge 8 across at least a horizontal width of the motion rail 2 for tight bearing on a central profile portion 2b of the motion rail 2.

Below the lower edge 8, the protrusions 9 and 14 which are fixedly connected to the support plate 5 protrude in a downward manner. In each case one of the bearing portions 10 and 15, respectively, is configured on mutually opposite sides of the two protrusions 9 and 14. The bearing portions 10 and 15 are disposed so as to be fixedly spaced apart from one another along the lower edge 8, only a comparatively modest lateral clearance for motion in relation to the motion rail 2 being available to the assembly device 1 in the assembled state shown. The clearance for motion may be less than, for example, 50% or, for example, 25%, better still less than 10%, in particular less than 5% and preferably less than 2% of a width of the motion rail 2, in particular, in the region of the attachment device 2d.

In order to be able to readjust the bearing portions 10 and 15 in relation to the assembly plate 3 in the horizontal direction, the guide protrusions 3h are extended so as to protrude beyond a lateral edge 3d of the assembly plate 3. Preferably, the assembly plate 3, in a region between the two guide protrusions 3h, is likewise extended beyond the edge 3d. A trunnion 21 on which an adjustment wheel 20 is mounted is attached to the guide protrusions 3h in a laterally protruding position. The adjustment wheel 20 on a side (not visible) which faces the assembly plate 3 has a driving contour (not visible).

In a region of an upper edge 19c, the intermediate plate 19 has a laterally protruding and strip-shaped beam portion 19a which is mounted between the guide protrusions 3h so as to be laterally displaceable in relation to the assembly plate 3. On a region of the beam portion 19a of the intermediate plate 19, which is covered by the adjustment wheel 20, an engagement structure (not shown), for example, in the form of a pin (not shown) which protrudes into the adjustment wheel, which engages in the driving contour of the adjustment wheel 20, for example, is configured. The driving contour of the adjustment wheel 20 is configured in such a manner that by rotating the adjustment wheel 20 the engagement structure of the beam portion 19a, and thus the intermediate plate 19 having the height readjustment installation 4, is readjustable in the horizontal direction so as to be parallel with the assembly plate 3.

LIST OF REFERENCE SIGNS

1 Assembly device
2 Motion rail
2a Profile portion
2b Profile portion (horizontal)
2c Profile portion
2d Attachment installation
3 Assembly plate
3a Rear side
3b Bores
3c Guide protrusion
3d Lateral edge (vertical)
3e Lateral edge (vertical)
3f Elongate hole
3g Lower edge (of the assembly plate)
3h Guide protrusion (horizontal)
4 Height readjustment installation
5 Support plate
5a Opening
5b Latching depression
6 Adjustment lever
6a Protrusion
7 Slide pin
8 Lower edge
9 Protrusion
10 Bearing portion
11 Beam portion
11a Threaded bolt
11b Connection portion
12 Knurled nut
12a Groove
13 Slide element
13a Engagement portion
13b Connection yoke
14 Protrusion
15 Bearing portion
16 Receptacle opening (on the support plate)
17 Furniture part
17a Side wall
17b Rear wall
17c Lower edge
18 Guide unit
18a Basic unit rail
19 Intermediate plate
19a Beam portion (strip-shaped)
19b Guide protrusion
19c Upper edge
20 Adjustment wheel
21 Trunnion

The invention claimed is:

1. A guide unit attachment device attaching a basic unit rail disposed on a second furniture part to a motion rail disposed on a first furniture part, the device comprising:
   an assembly plate affixed to the first furniture part;
   an arrester installation defined on the motion rail forming a stop for the first furniture part;
   a support plate displaceably mounted on the assembly plate, the support plate comprising a lower edge for engaging a horizontal profile portion of the motion rail, an arrester receptacle for receiving the arrester installation, and a protrusion protruding downwardly therefrom defining a first bearing portion for engaging a first vertical profile portion of the motion rail;
   a lateral readjustment assembly disposed on the support plate, the lateral readjustment assembly comprising a substantially horizontal beam portion extending from the support plate, a displaceable slide element guided on the beam portion having a protrusion protruding downwardly therefrom defining a second bearing portion for engaging a second vertical profile portion of the motion rail, the first and second bearing portions disposed in spaced apart positions proximate the lower edge of the support plate, each bearing portion having a side face facing an opposing side face on the respective other bearing portion, wherein the motion rail is disposed between the opposing side faces of the bearing portions, and an actuator engaging the slide element to displace the slide element on the beam portion in a lateral direction to readjust a position of the bearing portions to align the first furniture part in a horizontal direction in relation to the motion rail.

2. The device according to claim 1, wherein the lateral readjustment assembly is further configured to readjust the positions of the two bearing portions on the device independently of one another.

3. The device according to claim 1, wherein the positions of the two bearing portions on the device are adjustable in an interlinked manner by the laterally displaceable slide element of the lateral readjustment assembly.

4. The device according to claim 1, wherein the actuator comprises a set screw.

5. An attachment device comprising two attachment units for attaching a guide device to a first furniture part which, by way of two guide units of the guide device, is guided so as to be movable in relation to a second furniture part, each guide unit having a motion rail which is disposed on the first furniture part, wherein one of the attachment units for each motion rail attaches the first furniture part to a corresponding one of the two guide units, and wherein at least one of the two attachment units comprises a guide unit attachment device according to claim 1.

6. An attachment device comprising two attachment units for attaching a guide device to a first furniture part which, by way of two guide units of the guide device, are guided so as to be movable in relation to a second furniture part, each guide unit having a motion rail which is disposed on the first furniture part, one of the attachment units for each motion rail attaching the first furniture part to a corresponding one of the two guide units, wherein both attachment units comprise guide unit attachment devices according to claim 1, and wherein the two attachment units are configured to be mirror-symmetrical in relation to one another.

7. An item of furniture having a device according to claim 1.

* * * * *